United States Patent [19]

Shibata et al.

[11] Patent Number: 5,505,022
[45] Date of Patent: Apr. 9, 1996

[54] WINDOW REGULATOR

[75] Inventors: Kazuma Shibata, Kosai; Shinichi Naitou, Toyohashi; Yoshinori Takemura, Kosai, all of Japan

[73] Assignee: Asmo Co., Ltd., Kosai, Japan

[21] Appl. No.: 396,730

[22] Filed: Mar. 1, 1995

[30]  Foreign Application Priority Data

Mar. 15, 1994 [JP] Japan .................................. 6-044399
Oct. 28, 1994 [JP] Japan .................................. 6-265866

[51] Int. Cl.$^6$ ............................................... E05F 11/48
[52] U.S. Cl. .................................. 49/352; 49/349
[58] Field of Search .......................... 49/352, 349, 360, 49/362

[56] References Cited

U.S. PATENT DOCUMENTS

| | | | |
|---|---|---|---|
| 4,222,202 | 8/1980 | Pigeon | 49/352 |
| 4,253,277 | 3/1981 | Campbell et al. | 49/352 |
| 4,637,166 | 1/1987 | Ujihara | 49/352 |
| 4,691,475 | 9/1987 | Maekawa | 49/352 |
| 5,076,014 | 12/1991 | Cuyl | 49/349 X |
| 5,309,678 | 5/1994 | Adachi | 49/352 |

FOREIGN PATENT DOCUMENTS

| | | |
|---|---|---|
| 4-116579 | 10/1992 | Japan . |
| 4-321853 | 11/1992 | Japan . |
| 5-79245 | 3/1993 | Japan . |
| 5-32670 | 4/1993 | Japan . |

*Primary Examiner*—Philip C. Kannan

[57]  ABSTRACT

A thin window regulator which can be assembled easily and which requires less installation space inside a door panel is disclosed. Both longitudinal ends of a belt are connected to a pair of sliders and the belt is made into a ring shape. Sliders are movable along a guide rail and are biased closer to each other by springs. Thus, since the ring-shaped belt is wound around a sprocket and the sliding portion, tension is not reduced by a creep phenomenon and the belt does not loosen. One end of the ring shaped belt is formed to be wound around the sliding portion. Thus, the window regulator can be made thinner compared with prior art systems in which both ends of a belt are wound around pulleys and a required installation space inside the door at the upper portion of the guide rail can be made thinner.

12 Claims, 12 Drawing Sheets

WINDOW REGULATOR

CROSS REFERENCE TO RELATED APPLICATIONS

This application is based on and claims priority from Japanese Patent Applications No. 6-265866 filed Oct. 28, 1994 and No. 6-44399 filed Mar. 15, 1994, the contents of which are incorporated herein by reference.

BACKGROUND OF THE INVENTION

1. Field of the Invention

This invention is related to a window regulator which drives a door glass of a vehicle upward and downward.

2. Related Art

In a window regulator which drives a door glass of a vehicle, the door glass is fixed to an endless belt in a ring shape which is wound around a pulley rotated by a motor so that the door glass is moved up and down along a guide rail.

The window regulator of this movable belt type is adopted in many kinds of window regulators, since it has higher durability and generates less noise than a movable wire type.

However, when the belt is loosened by a creep phenomenon during long use, transmission of movement force of the pulley cannot be attained well. Therefore, the belt has to be installed with tension thereon to prevent it from loosening.

Figure 23:
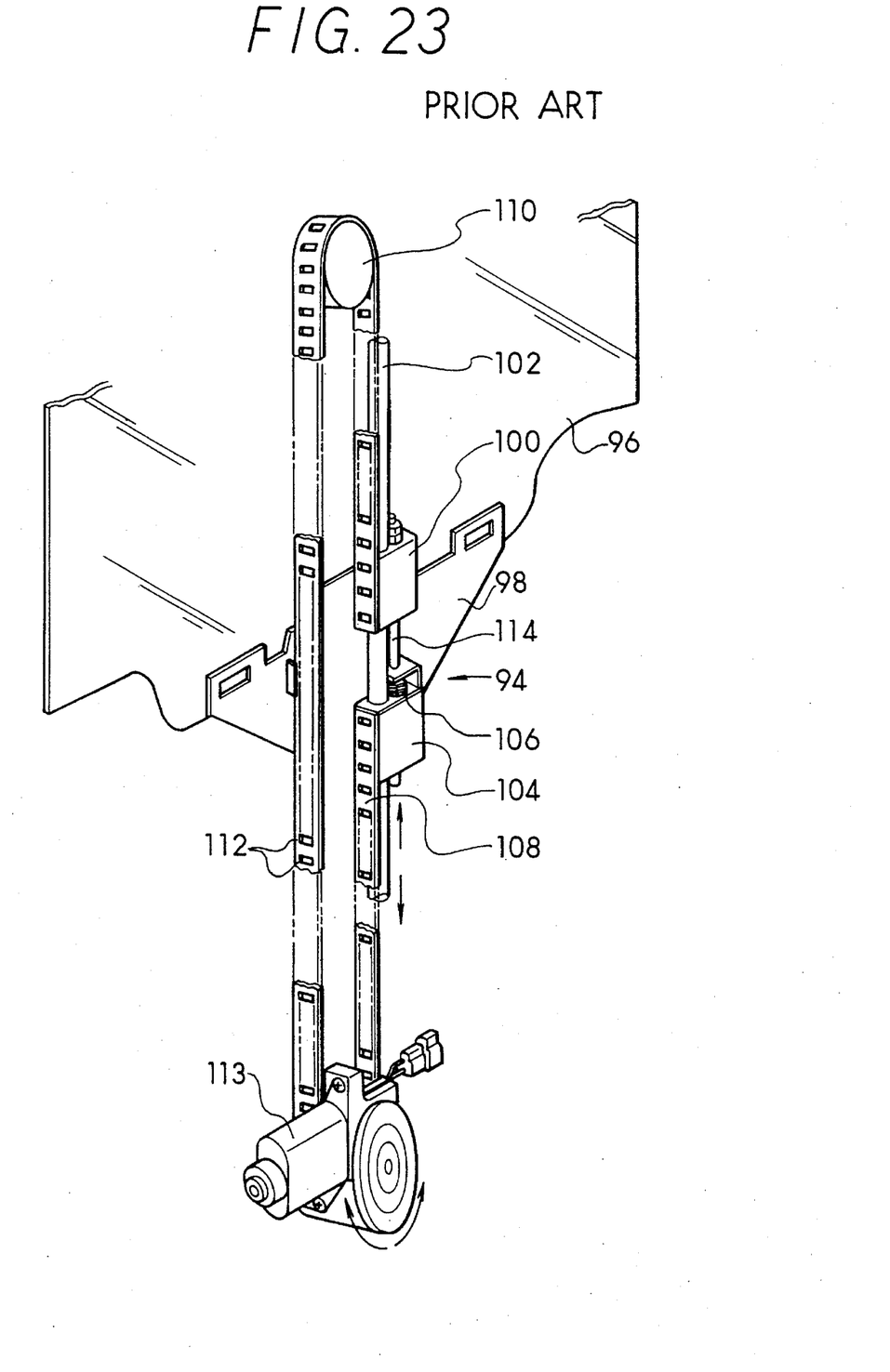
FIG. 23 is a perspective view illustrating a window regulator in the prior art.

The inventors have proposed a regulator as shown in FIG. 23 (Japanese Laid-Open Patent Publication No. 4-321853).

In this regulator 94, fixed slider 100 is fixed to carrier plate 98 which is fixed to door glass 96. The fixed slider 100 moves with carrier plate 98 along guide pole 102 which is installed on a door panel of a vehicle. Movable slider 104 is guided along guide pole 102.

A tension application member which is formed by spring 106 is installed on movable slider 104 and biases movable slider 104 away from fixed slider 100. The ends of belt 108 are connected respectively to movable slider 104 and fixed slider 100 to form a ring so that belt 108 is applied with tension and is prevented from loosening.

Thus, a tension application member is installed at a place which is offset from the movement path of belt 108 so that no friction force is caused at the connection portions of the ends of belt 108 and the durability is high.

In belt 108, engagement holes 112 which engage pulley 110 need to be made. Further, belt 108 needs to have a minimum width, since it needs sufficient pulling strength. Thus, pulley 110 which is installed at the upper portion of regulator 94 also needs to be of a minimum thickness. Since a space in the width or transverse direction of a vehicle door on the upper portion of the door is small, pulley 110 is likely to interfere with the door panel.

From the relation to the height of the door, a sprocket (not shown in the figure) which is driven by motor 113 needs to be offset from the motor. The conventional regulator 94 cannot be installed as desired, because installation freedom at the lower portion of the door is limited. Moreover, movable slider 104 which moves along through shaft 114 and fixed slider 100 must be assembled together so that a tension application member which applies tension to belt 108 is formed. Therefore, the window regulator assembly operation is complicated.

SUMMARY OF THE INVENTION

In view of the foregoing, it is an object of the present invention to provide a window regulator for a vehicle which may be assembled easily and installed in a small space inside a vehicle door panel.

In a window regulator according to a first aspect of the present invention, a tension application member is connected to one end or both ends of a belt so that the belt is made into a ring shape. One end of the ring-shaped belt is wound around a rotary member which is installed on a lower bracket. The other end is wound around a sliding portion which is formed on an upper bracket. Therefore, in comparison to the conventional mechanism in which both ends of the belt are wound around the rotary members, a window regulator according to the present invention is made thinner. Also, an attachment space of a guide member to the upper portion of the door may become thinner and the number of component parts can be reduced. A tension application member is movable along a guide member which is formed like an arch and is biased closer to each other. Thus, when the ring shaped belt is wound around the rotary member and the sliding portion, it will not be loosened due to tension reduction by a creep phenomenon.

Preferably, a portion of the rotary member can be extended in a direction away from the rotary axis of the rotary member by a guide plate. Thus, according to the height of the door, even if the rotary member is installed away from the guide member, the belt is smoothly movable and the window regulator can be made thinner.

Preferably, a width of the belt which slides over the sliding portion is partially narrow. Thus, the thickness of the sliding portion is made thinner, and the attachment space inside the door can be made even thinner.

Preferably, one end of the belt is connected to the slider which moves along the guide member. On the other hand, a fixed guide is fixed to a carrier plate which carries a door glass. Accommodating holes are formed on the fixed guide and the slider. A spring is accommodated in the accommodating holes and biases the slider away from the fixed guide. Thus, one tension application member is formed separately by the slider and the fixed guide. Since the spring is retained in the accommodating holes, the window regulator is made compact, the regulator assembly operation is made easy and an attachment space for the regulator can be made small.

Preferably, a connection portion of the belt which is connected with the tension application member is inclined in the same direction as the twist direction of the belt caused between the sliding portion and the rotary member. Thus, in the connection portion of the belt, an extra twist will not be produced and a burden on the regulator caused by the twist of the belt is reduced. The window regulator can be made much thinner with the belt so inclined.

In a window regulator according to a second aspect of the invention, one end of the belt is wound around a guide plate. An engagement groove which is formed on the guide plate is inserted into and engaged with the upper portion of a guide member. Therefore, the number of component parts which fix the guide plate in place can be reduced and the regulator assembly operation is simplified. The guide plate does not fall down since it is pulled toward the guide member by the belt.

Preferably, a bearing is formed to extend from a base plate of a lower bracket, and a rotary member is supported by the bearing. The upper surface of the rotary member is retained by a presser piece which builds up or rises from the base plate, bends and projects onto the base plate. Thus, a cover which retains the rotary member can be omitted and the number of component parts can be reduced.

DETAILED DESCRIPTION OF THE PREFERRED EMBODIMENTS

The present invention will be described in detail with reference to the embodiments shown in the accompanying drawings.

Figure 1:
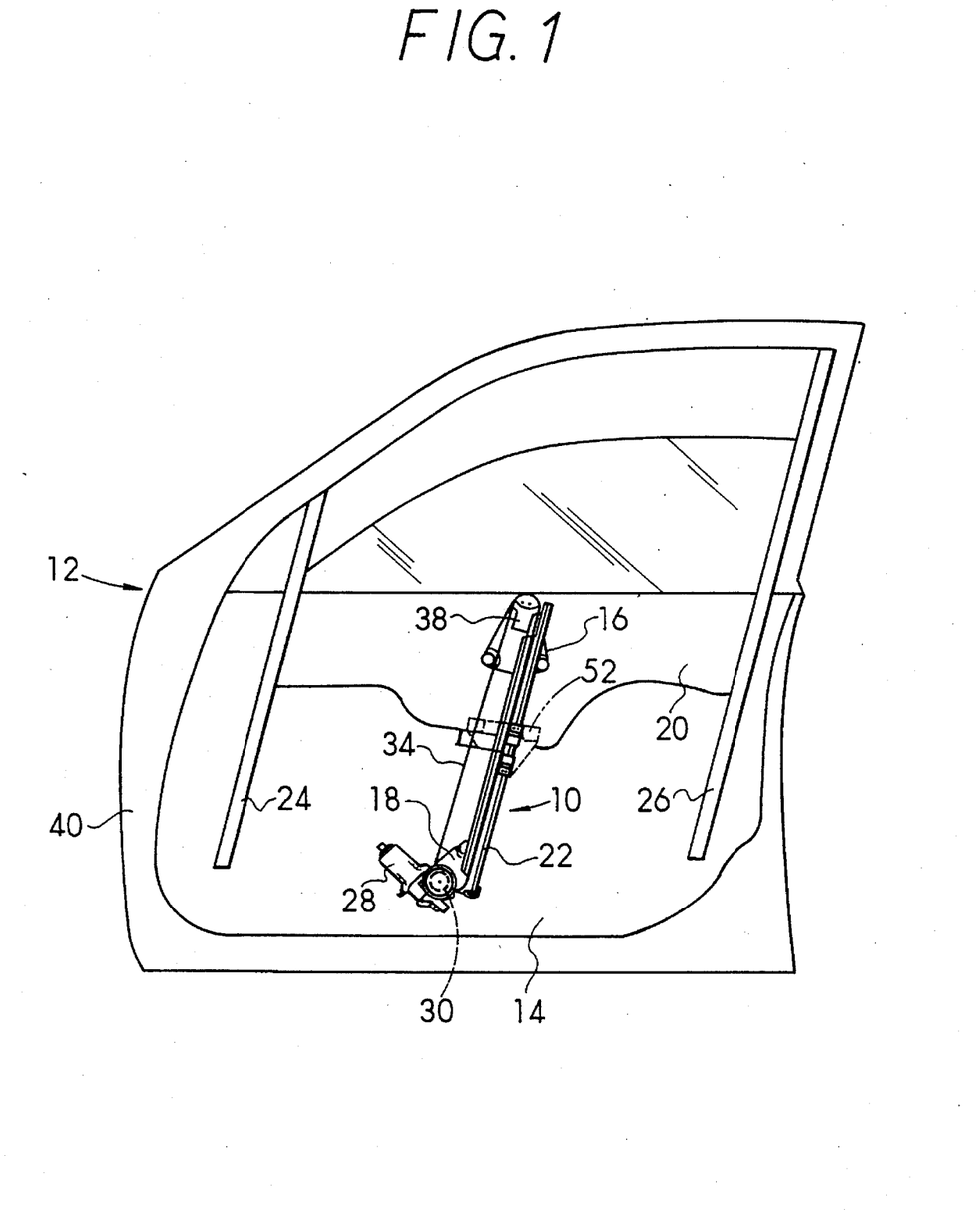
FIG. 1 is a side view illustrating an assembled state of a window regulator seen in the direction of vehicle width in a first embodiment of the present invention.
Figure 2:
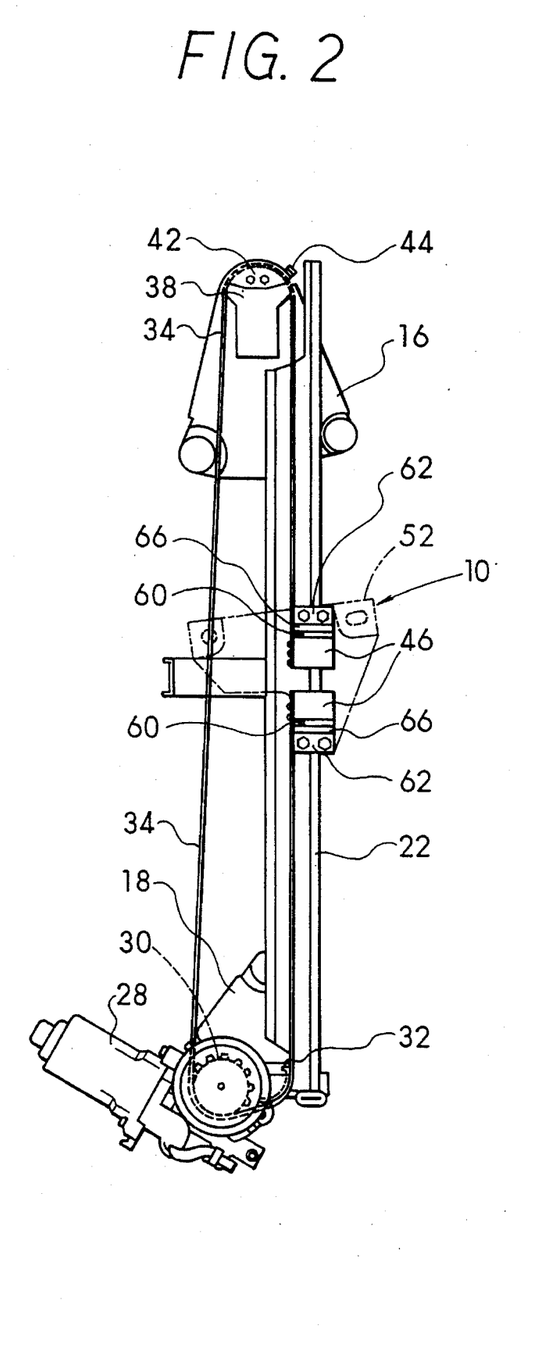
FIG. 2 is a side view illustrating the window regulator as seen in the direction of vehicle width in the first embodiment.
Figure 3:
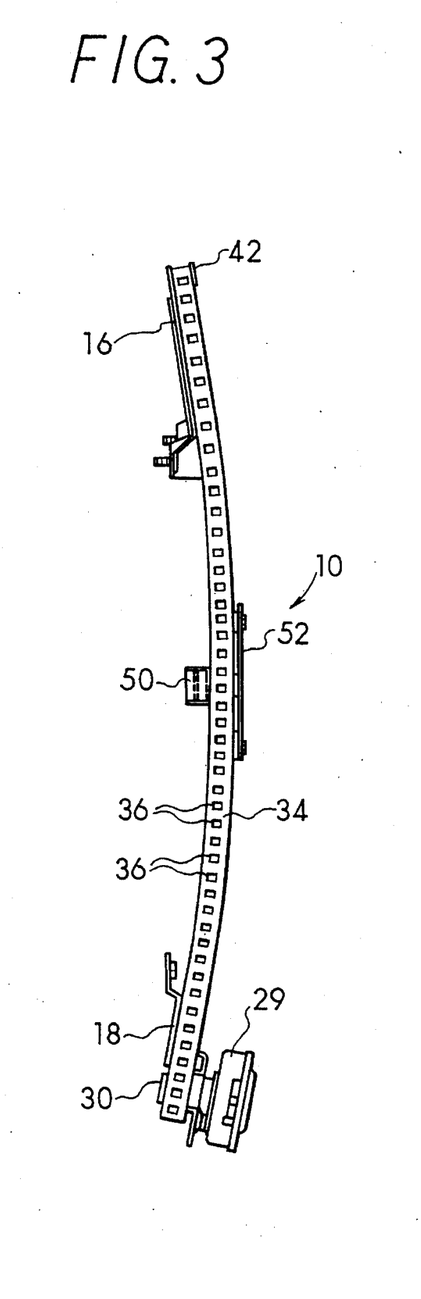
FIG. 3 is a side view illustrating the window regulator as seen from the rear of the vehicle in the first embodiment.
Figure 4:
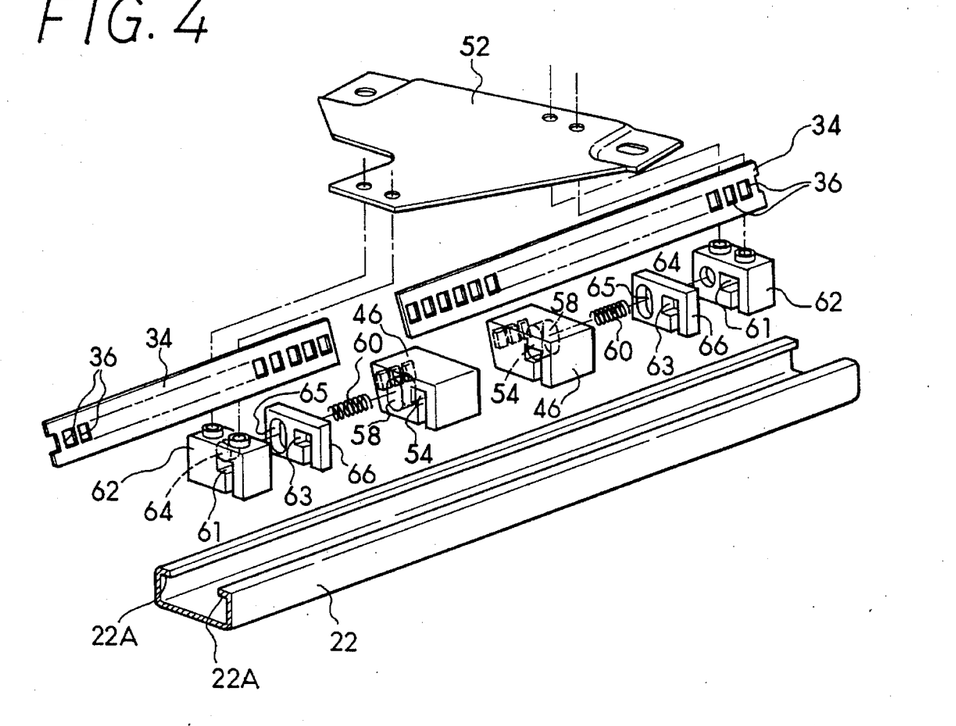
FIG. 4 is an exploded perspective view illustrating the tension application member of the window regulator in the first embodiment.

As shown in FIGS. 1 through 3, upper bracket 16 and lower bracket 18 which are fixed to inner panel 14 of vehicle door 12 are installed at the top and the bottom of window regulator 10 according to the first embodiment. Guide rail 22 which is formed like an arch along an up-and-down path of door glass 20 is built over upper bracket 16 and lower bracket 18. As shown in FIG. 4, the cross-section of guide rail 22 is formed in a channel shape and guide pieces 22A are bent to face each other to make the opening portion narrow. As shown in FIG. 1, guide rail 22 is placed along the top-and-bottom direction of door 12 and placed between guide frames 24 and 26 which face each other. The longitudinal direction (vertical direction in FIG. 1) of guide rail 22 is substantially parallel to guide frames 24 and 26. Guide frames 24 and 26 slidably retain both ends of door glass 20 in the front and rear directions of the vehicle.

On the other hand, motor 28 is fixedly installed on lower bracket 18 which is fixedly installed at the lower portion of door 12. A reduction gear accommodated in case 29 (shown in FIG. 3) is installed on the drive shaft of motor 28 to rotate sprocket 30 through a reduction gear.

Figure 5:
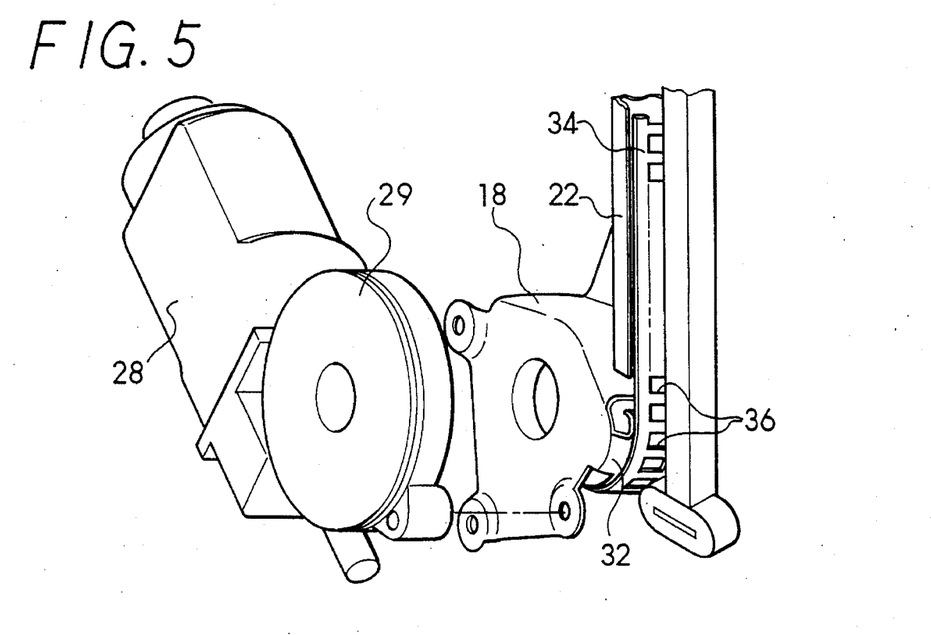
FIG. 5 is a perspective view illustrating the driving portion of the window regulator in the first embodiment.

As shown in FIG. 2, guide plate 32 which curves toward guide rail 22 is formed on lower bracket 18 at a place away from the outer circumference surface of sprocket 30 (see FIG. 5). If belt 34 is wound around sprocket 30 through guide plate 32, the rotary axis of sprocket 30 can be placed away from guide rail 22. Thus, motor 28 which rotates sprocket 30 through the reduction gear can be installed at a desired place and motor 28 does not interfere with door 12.

Figure 6:
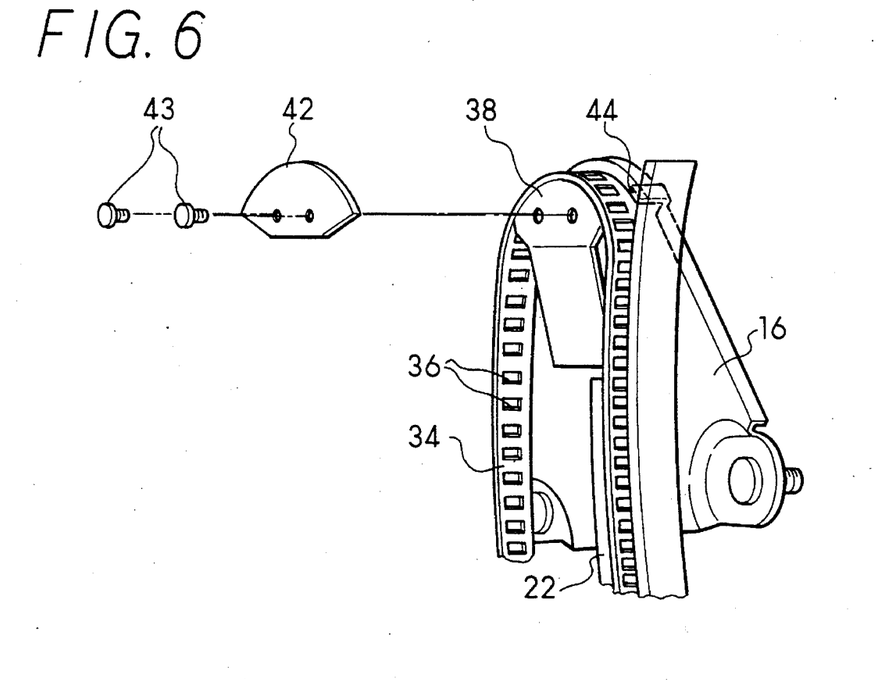
FIG. 6 is a perspective view illustrating the sliding portion of the window regulator in the first embodiment.

On the other hand, a band which is wound around sprocket 30 is made of a flexible resin belt 34. As shown in FIG. 3, rectangular holes 36 are formed continuously with a fixed separation distance between adjacent holes in the longitudinal direction of belt 34. As shown in FIG. 6, the upper portion of belt 34 is engaged with sliding portion 38 which is formed by raising the top of a generally triangularly shaped upper bracket 16 installed at the upper portion of the side of inner panel 14 (see FIG. 1) and which is shaped into an arc at the top thereof.

Since belt 34 is made of a resin material with a small coefficient of sliding friction, a rotary pulley conventionally used does not have to be installed in the upper portion of door 12. The pulley does not interfere with door 12, and the number of component parts associated with the pulley can be reduced. The projection amount or raised amount of sliding portion 38 is made to be the same as the width of belt 34. Resin cap 42 with a generally semicircular shape is installed by screws 43 on sliding portion 38 at the side of outer panel 40 in FIG. 1. As shown in FIGS. 2 and 6, resin cap 42 protects belt 34 against falling from sliding portion 38 toward a vehicle compartment (left side of FIG. 6). Instead of resin material, the cap may be made of iron. Auxiliary plate 44 whose tip is bent toward the belt side in FIG. 6 is formed on the top of upper bracket 16 and protects belt 34 against falling down toward the right side of FIG. 6.

Figure 7:
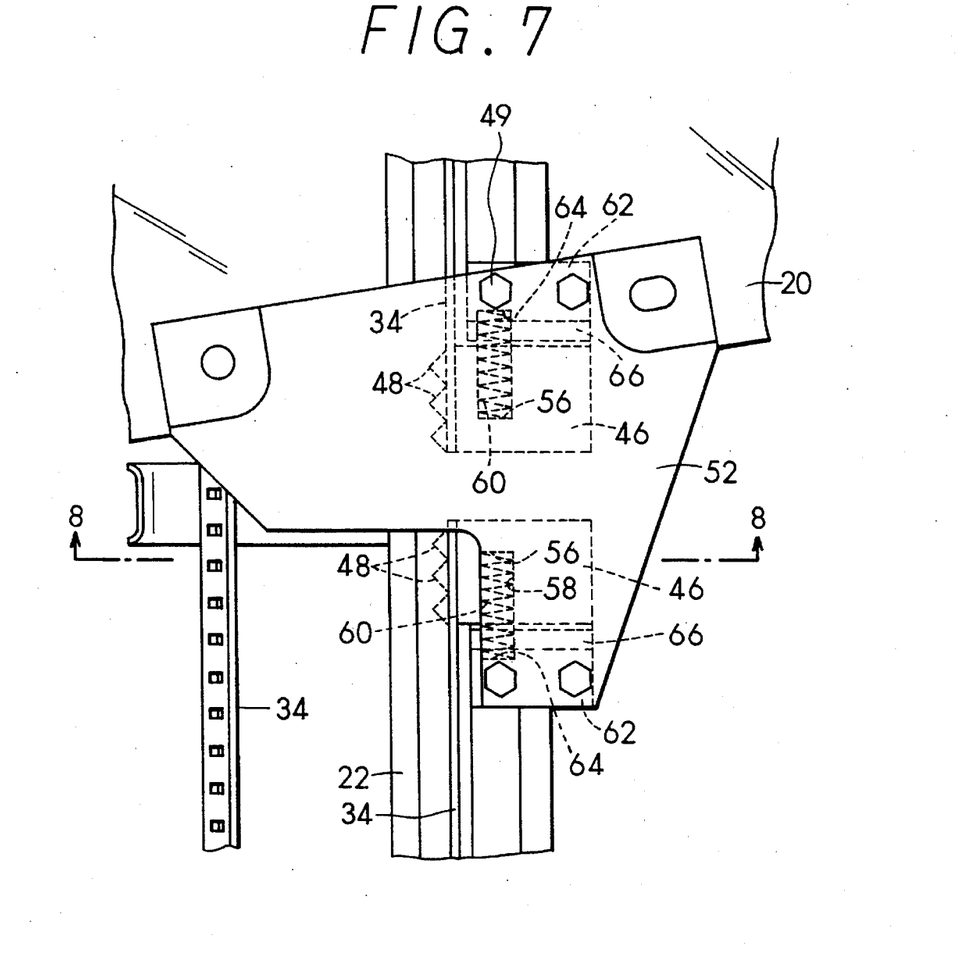
FIG. 7 is a side view illustrating the tension application member of the window regulator in the first embodiment.
Figure 8:
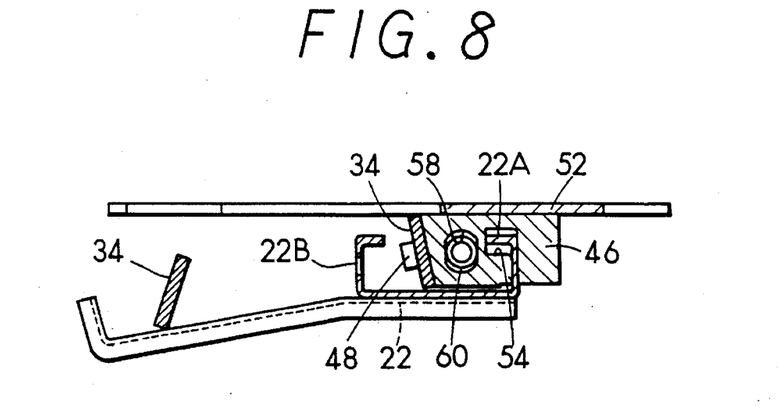
FIG. 8 is a cross sectional view taken along the line 8—8 in FIG. 7.

As shown in FIGS. 4, 7 and 8, both longitudinal ends of belt 34 are interconnected by fitting mushroom-shaped protrusions 48 formed on sliders 46 into engagement holes 36 of belt 34 so that belt 34 makes a toroidal or ring shape. Sliders 46 are in a generally rectangular block shape and an attaching face of belt 34 inclines toward side face 22B of guide rail 22. That is, belt 34 inclines toward the other portion of belt 34 at the left in FIG. 8. The opposing portion of belt 34 is also inclined toward sliders 46 by restriction plate 50 (shown in FIG. 3) which is extended in a sidewise direction from guide rail 22. That is, the cross section of toroidal shape belt 34 inclines toward each other. Since that defines the twist direction of belt 34, the life cycle of belt 34 becomes longer. In addition, since the spacing between guide rail 22 and carrier plate 52 to which the bottom end of door glass 20 is fixed, the spacing can be made smaller, and window regulator 10 can be made thinner in the sidewise or transverse direction (vehicle width direction).

On the other hand, rectangular-shaped guide groove 54 penetrates in the height direction of slider 46. Guide piece 22A of guide rail 22 is inserted in guide groove 54 and slider 46 can move along guide rail 22. Also, the thickness of guide piece 22A is thinner than the groove width in the vehicle width direction or in the vehicle sidewise direction of guide groove 54 (FIG. 8) and the guide piece 22A is movable in the vehicle width direction against guide rail 22.

Ellipse hole 58 having bottom 56 is formed at the left side of guide groove 54. Spring 60 is inserted in ellipse hole 58. One end of spring 60 is stopped at bottom 56, while the other end of spring 60 is fixed to depression 64 of fixed guide 62 which is fixed to carrier plate 52 with bolt 49. Top and bottom sliders 46 are biased closer to each other by springs 60.

Elastic plate 66 is interposed between fixed guide 62 and slider 46, and is attached to fixed guide 62 with adhesive. The elastic plate 66 absorbs the sound of the collision when fixed guide 62 and slider 46 collide with each other. In the first embodiment, although elastic plate 66 is interposed between fixed guide 62 and slider 46, it need not be provided if the sound of the collision is negligible. Guide grooves 61 and 63 mating with guide piece 22A are formed on fixed guide 62 and elastic plate 66 so that fixed guide 62 and elastic plate 66 may slide along guide rail 22.

Like guide groove 54 of slider 46, the thickness of guide piece 22A is made thinner than groove width of guide grooves 61 and 63 in the direction of vehicle width. Also, guide piece 22A is movable in the direction of vehicle width against guide rail 22. Therefore, sliding friction between guide rail 22 and fixed guide 62 which is fixed to carrier plate 52 does not become large when door glass 20 is opened and closed even if carrier plate 52 slides off away from guide rail 22 in the vehicle width direction due to errors in assembly door members or dimensional errors. Ellipse hole 65 is also formed on elastic plate 66 and it allows play in the movement of fixed guide 62 along with ellipse hole 58 of slider 46. Therefore, spring 60 whose one end is retained by depression 64 does not twist even if fixed guide 62 and slider 46 move in opposite directions to each other in the vehicle width direction.

Next, the operation of the first embodiment will be explained.

In this window regulator 10, sliders 46 which are installed at the top and bottom of the regulator are biased toward each other by springs 60. Therefore, tension is always applied to ring-shaped belt 34 to prevent it from loosening.

For example, to raise door glass 20 upward, motor 28 is driven to rotate sprocket 30 counterclockwise (see FIG. 2). By this operation, fixed guide 62 which is fixed to carrier plate 52 is lifted by slider 46. Thus, door glass 20 rises.

Sliding on sliding portion 38, belt 34 lifts slider 46 which is mounted at the upper portion. By resisting the lifting force, belt 34 is pushed down by the biasing force of spring 60. Thus, tension is applied to belt 34 and the belt is prevented from loosening. Even when the lifting force overcomes the biasing force of spring 60 and slider 46 collides with fixed guide 62, there will not be any sound of collision, because elastic plate 66 is interposed therebetween.

On the other hand, since slider 46 is biased upward by spring 60, the portion of belt 34 between sprocket 30 and lower side slider 46 is attracted upward and no loosening is caused. Because of this, the rotational turning force of sprocket 30 is converted to a movement force of carrier plate 52 through belt 34. Thus, door glass 20 smoothly rises.

Play in the movement in the direction of vehicle width is provided by fixed guide 62 to which carrier plate 52 is connected. Therefore, assembly errors are taken into account and door glass 20 does not have any burden when door glass 20 is attached to carrier plate 52.

Moreover, since no pulley is installed on the top of window regulator 10 where belt 34 is wound as in prior art systems, mounting space can be minimized.

Figure 9:
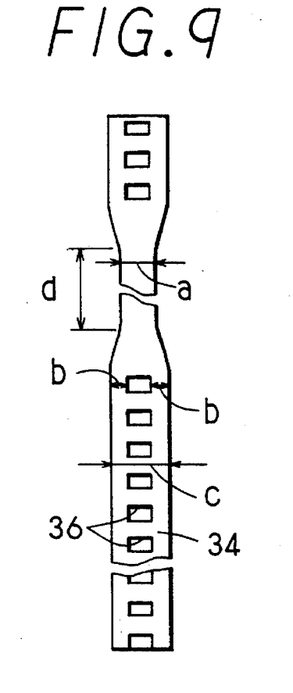
FIG. 9 is a front view illustrating a modification of the window regulator belt in the first embodiment.

In the first embodiment, the width of belt 34 is made constant but, as shown in FIG. 9, some portions of belt 34 which slide on sliding portion 38 may be of a narrow width "a". The narrow width "a" is narrower than the standard width "c". If "b" is the width of both ends calculated by standard width "c" minus the width of engagement hole 36, the size of narrow width "a" is set so that "c" is greater than "a" and "a" is approximately equal to 2"b". Thus, narrow width "a" withstands tension as well as standard width "c". Length "d" of narrow width "a" is set a little longer than the distance of up-and-down movement of door glass 20. Thus, the thickness sliding portion 38 can be thinner.

Figure 10:
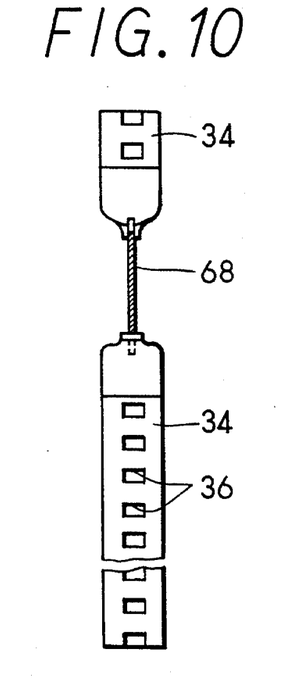
FIG. 10 is a front view illustrating another modification of the window regulator belt in the first embodiment.

As shown in FIG. 10, wire 68 can be attached to the portion which corresponds to narrow width "a" so that sliding portion 38 can be even thinner.

Figure 11:
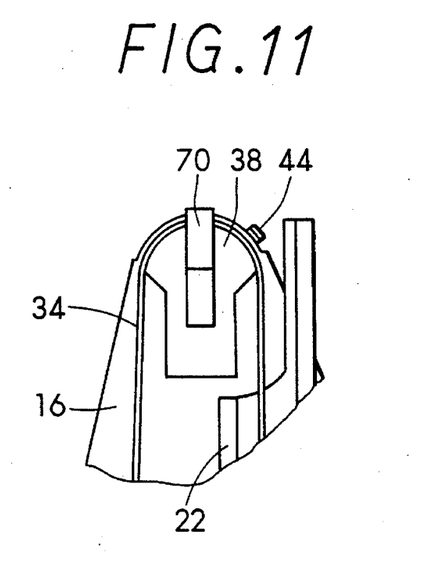
FIG. 11 is a side view illustrating a modification of the sliding portion of the window regulator in the first embodiment.
Figure 12:
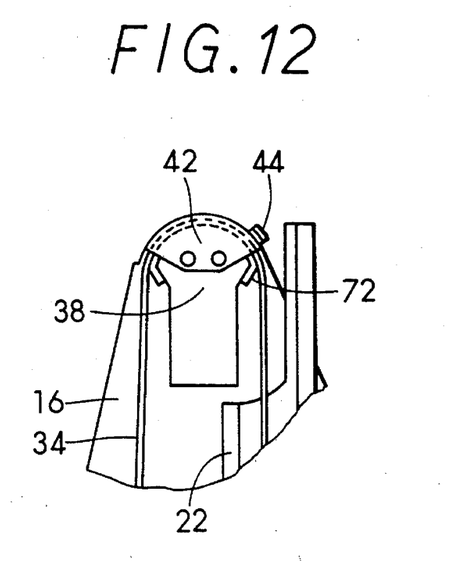
FIG. 12 is a side view illustrating another modification of the sliding portion of the window regulator in the first embodiment.

Further, in the first embodiment, resin cap 42 is attached to sliding portion 38 to prevent fallout of belt 34. However, as shown in FIG. 11, a projection surface may be cut from sliding portion 38 and raised to provide supporting piece 70 so that the portion of belt 34 having narrow width "a" can also be prevented from falling down from sliding portion 38 toward the front side in the preceding figures. Thus, the number of component parts can be reduced. In addition, as shown in FIG. 12, resin sliding contact member 72 may be fitted on the sliding surface of sliding portion 38 so that abrasion of belt 34 can be suppressed. Sliding contact member 72 can be integrated with resin cap 42 without increasing assembly work manhours and the component parts.

Further, in the first embodiment, although guide rail 22 determines the location of slider 46 as shown in FIG. 8, many other techniques can be adopted to perform that function.

Figure 13:
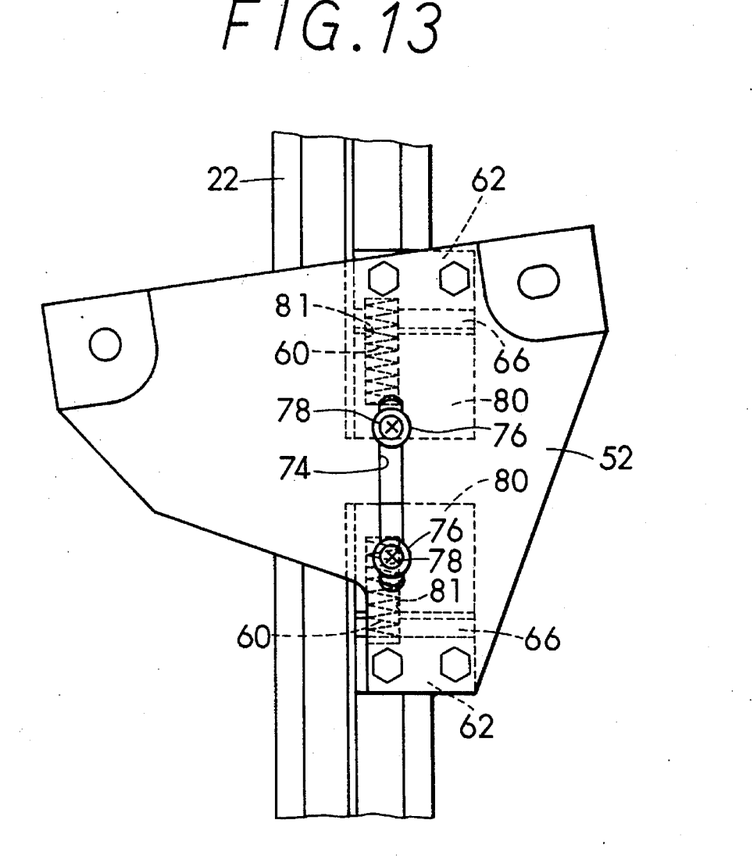
FIG. 13 is a side view illustrating a modification of the tension application member of the window regulator in the first embodiment.
Figure 14:
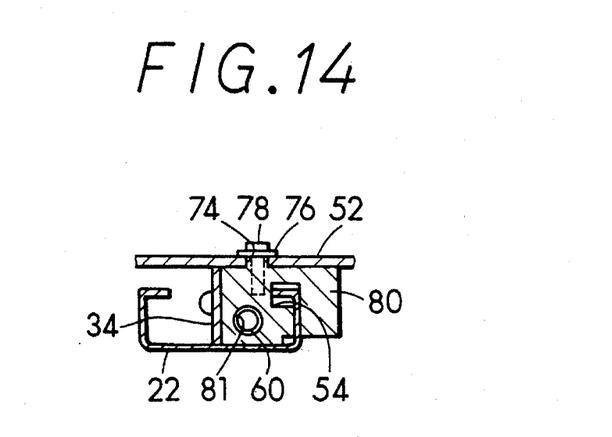
FIG. 14 is a cross-sectional view illustrating the slider portion of the window regulator in the modified embodiment.

That is, as shown in FIGS. 13 and 14, long hole 74 is made on carrier plate 52 in the longitudinal direction of guide rail 22, and screws 78 with washers 76 are inserted into long hole 74. With the tips of the screws 78 being connected to sliders 80, the location between sliders 80 and carrier plate 52 is fixed, and sliders 80 move with carrier plate 52 in the direction of vehicle width. Tension is applied to belt 34 by sliders 80 biased by springs 60 moving closer to each other along long hole 74. In the embodiment, since sliders 80 do not separate from carrier plate 52, accommodating holes 81 which accommodate springs 60 are circular. Although belt 34 is connected to sliders 80 without inclination, it may be of course connected with inclination.

Figure 15:
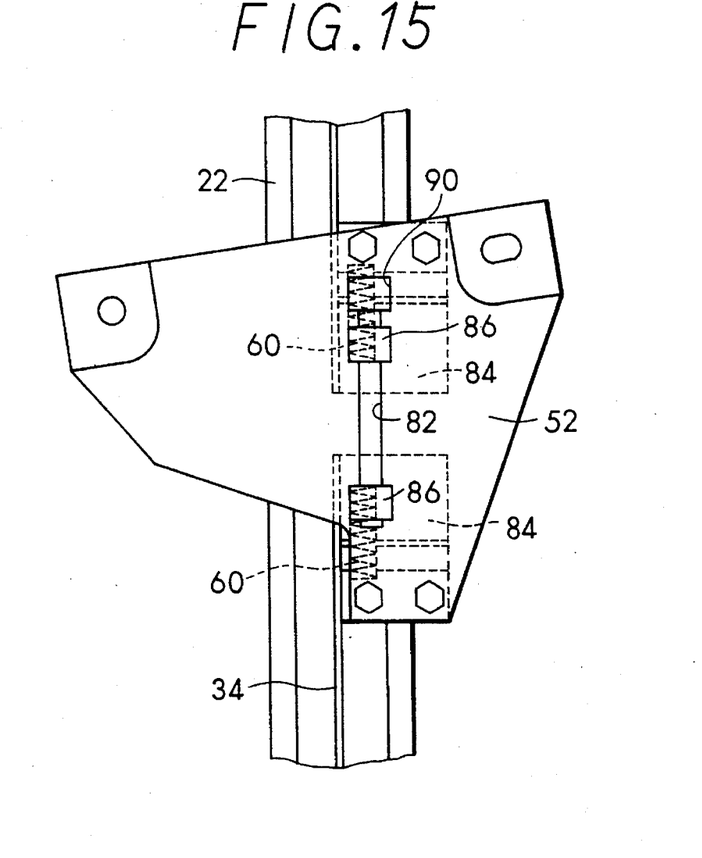
FIG. 15 is a side view illustrating another modification of the tension application member of the window regulator in the first embodiment.
Figure 16:
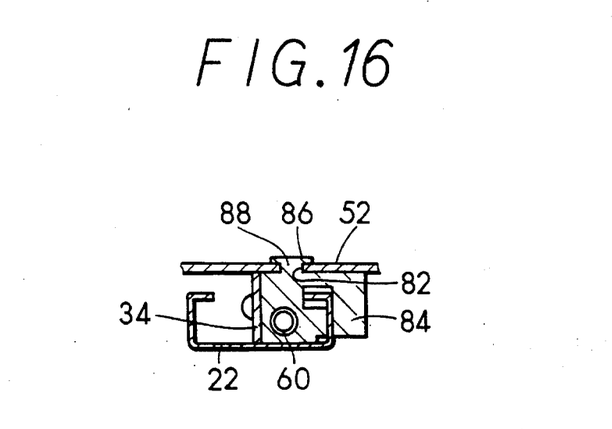
FIG. 16 is a cross-sectional view illustrating the slider portion of the window regulator in the second modification.

Still further, as shown in FIGS. 15 and 16, rectangular hole 82 may be made on carrier plate 52 in the longitudinal direction of guide rail 22 and stopper plate 86 which is installed on the front side of carrier plate 52 is connected and integrated with sliders 84 at portions 88 so that portions 88 may be guided by rectangular holes 82. On the top of the rectangular holes 82, attaching hole 90 in which check plate 86 is inserted is formed and to make the regulator assembly operation easy.

Next, a window regulator according to the second embodiment will be explained.

Figure 17:
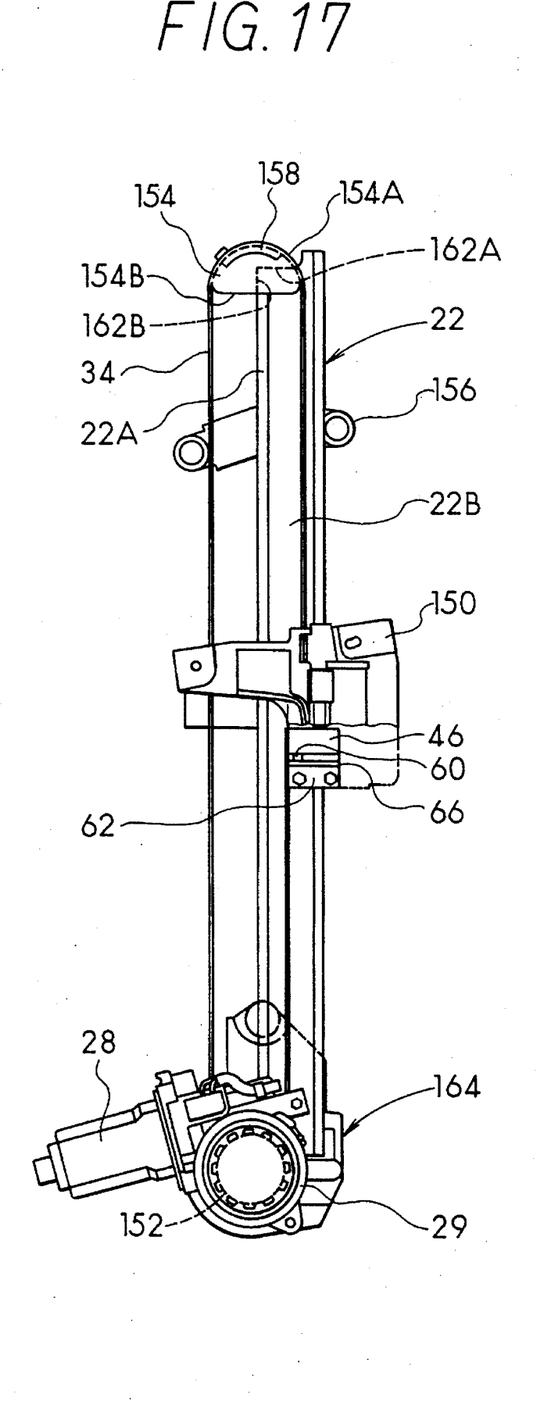
FIG. 17 is a side view illustrating the window regulator as seen in the direction of vehicle width in a second embodiment of the present invention.
Figure 18:
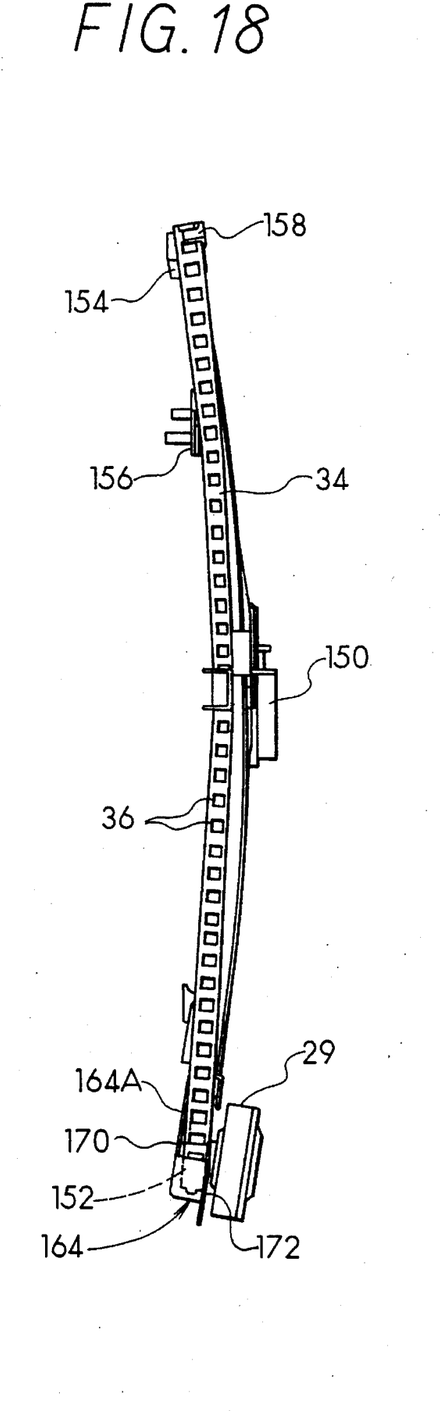
FIG. 18 is a side view illustrating the window regulator as seen from the rear of vehicle in the second embodiment.

As shown in FIGS. 17 and 18, in the second embodiment, only one end of belt 34 is connected to slider 46 and the other end is connected to carrier plate 150. That is, loosening of belt 34 is eliminated by one spring 60. Thus, belt 34 can be wound around sprocket 152 and belt guide 154 which have different outer diameters without setting guide plate 32 as in the first embodiment shown in FIG. 2.

The top of guide rail 22 is fixed to upper bracket 156 which is set on the lower portion from the top end. Belt guide 154 around which belt 34 is wound is set on the top end of guide rail 22.

Figure 19:
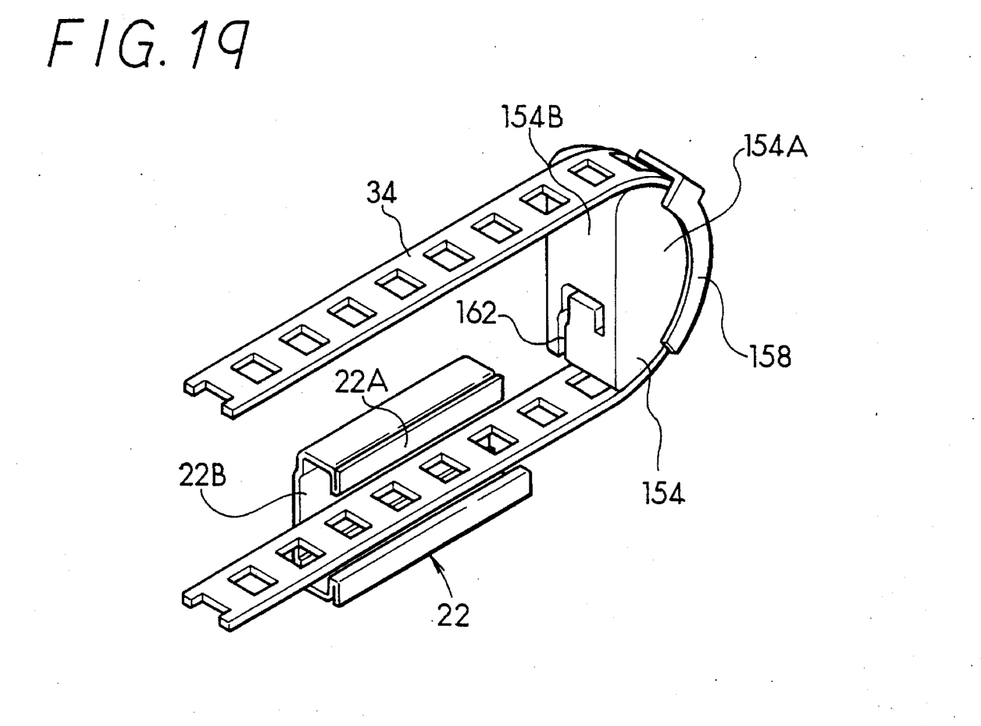
FIG. 19 is a perspective view illustrating the belt guide of the window regulator in the second embodiment.

As shown in FIG. 19, belt guide 154 is a block with circularly shaped apex 154A, and cap 158 is mounted on apex 154A so that belt 34 does not fall down nor disengage.

Engagement groove 162 is formed on the bottom face 154B of belt guide 154 to correspond to the sectional form of guide rail 22. As shown in FIG. 17, one end of guide rail 22 is inserted into groove 162 until it touches groove base 162B. In this state, guide piece 22A touches groove wall 162B. When belt 34 slides on belt guide 154, the transversal force applied to belt guide 154 is received by guide piece 22A.

Thus, since belt guide 154 is hooked by only being inserted into the top of guide rail 22, the number of members to be used is reduced and assembly is simplified. Belt guide 154 does not fall down because it is pushed toward guide rail 22 by belt 34.

Figure 20:
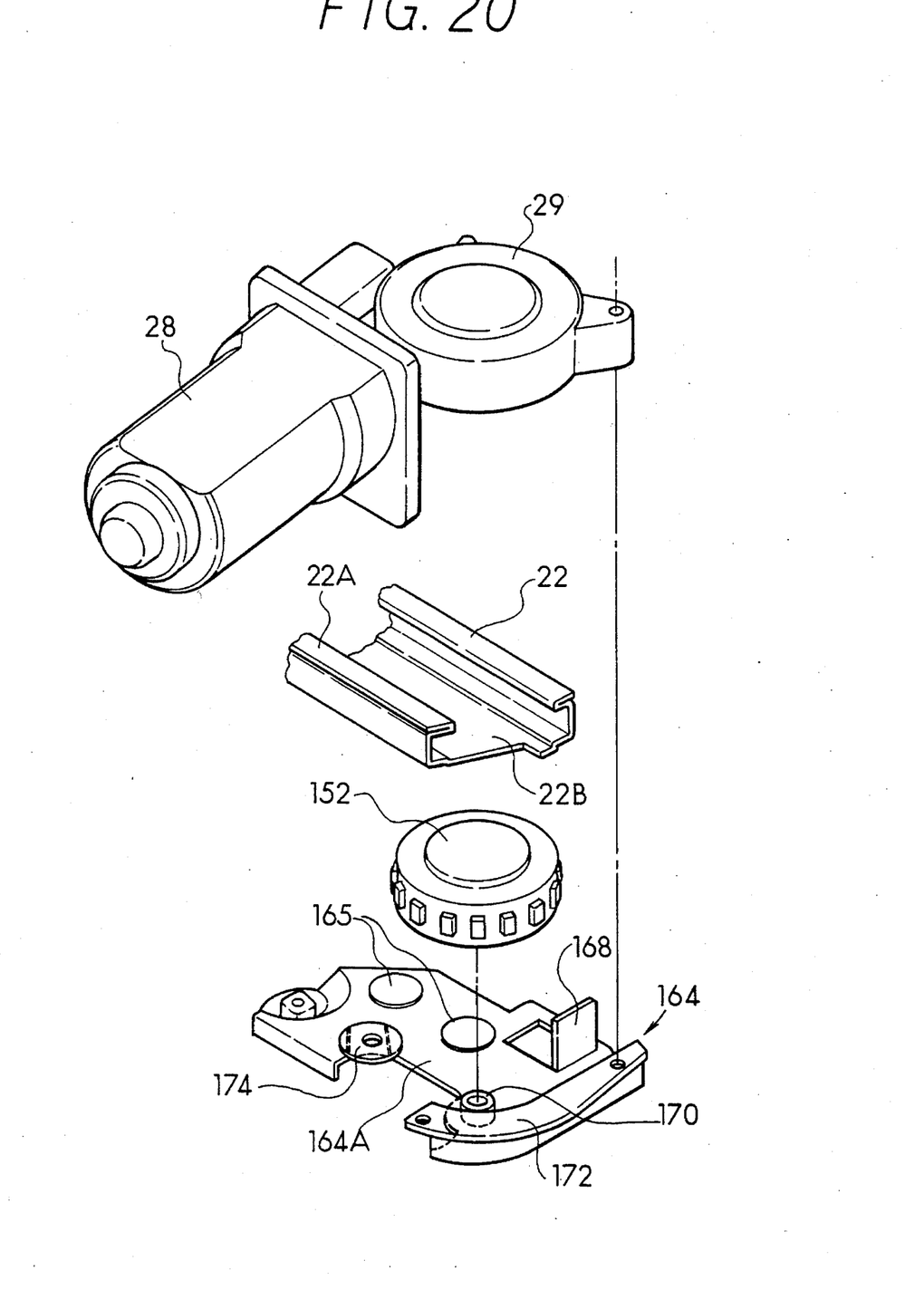
FIG. 20 is a perspective view illustrating the driving portion of the window regulator in the second embodiment.

On the other hand, as shown in FIG. 20, base portion 22B of guide rail 22 is fixed on spot portion 165 which is formed on base plate 164A of lower bracket 164. Stopper plate 168 is formed on the base plate 164A and restricts the movement of carrier plate 150 which is guided by guide rail 22 and moves downward.

Bearing 170 is provided on base plate 164A. Sprocket 152 is supported by bearing 170. Presser piece 172 builds up from base plate 164A and projects upward from base plate 164A to surround the upper outer circumference of sprocket 152.

Moreover, motor supporting plate 174 is set on base plate 164A at the same height as presser piece 172. Motor 28 is attached to motor supporting plate 174 and presser piece 172, and case 29 which has a built-in reduction gear is located on sprocket 152.

Thus, since sprocket 152 is retained by presser piece 172 to which motor 28 is attached, a cover which retains sprocket 152 can be omitted and the number of component parts can be reduced.

Since the present invention has the above construction, the window regulator can be made thinner, the assembly is easy and the installation space required inside the door panel can be reduced. Also, the number of component parts can be reduced and the window regulator can be made more inexpensively.

Although the tension application member shown in FIG. 17 adopted the spring 60 in the second embodiment, an equivalent tension application member can be adopted.

Figure 21:
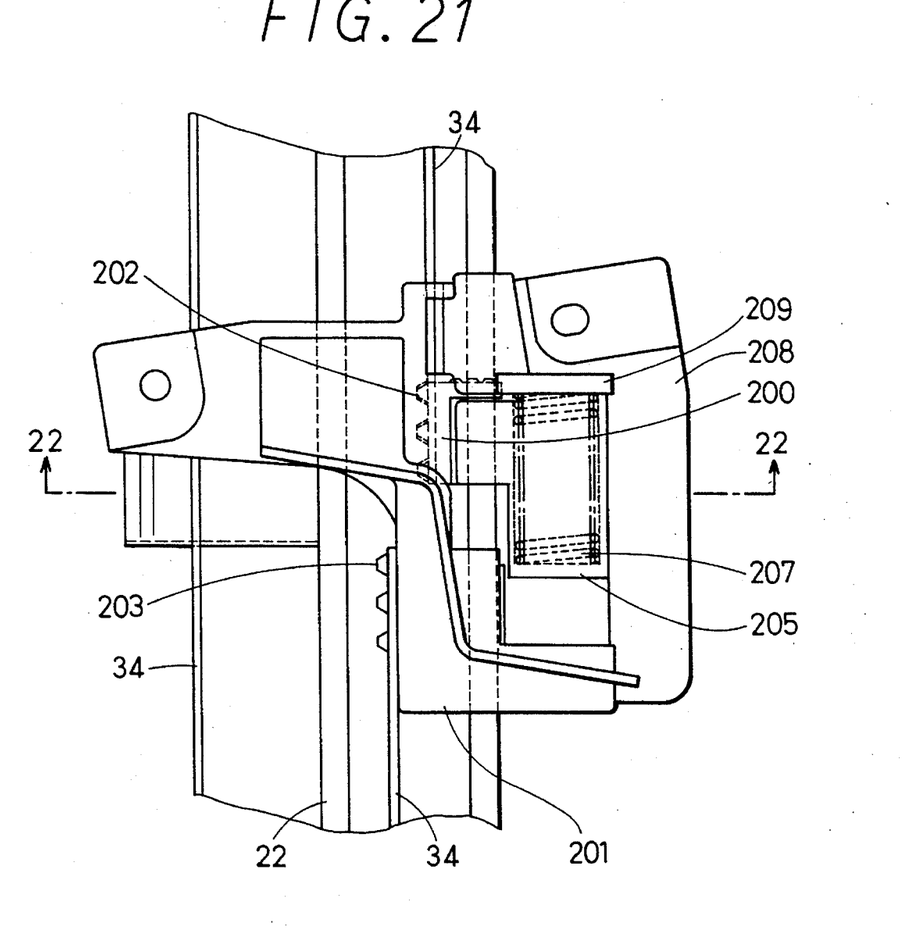
FIG. 21 is a partial side view illustrating a modification of the tension application member in the second embodiment.
Figure 22:
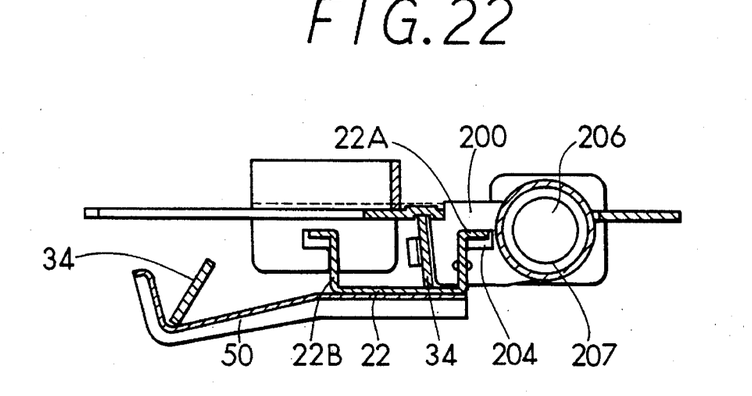
FIG. 22 is a cross-sectional view taken along the line 22—22 in FIG. 21.

As shown in FIGS. 21 and 22, both longitudinal ends of the belt 34 are interconnected by fitting mushroom-shaped portions 202 and 203 formed respectively on sliders 200 and 201 into engagement holes 36 of belt 34 so that belt 34 makes a toroidal or ring shape. Attaching faces of sliders 200 and 201 to belt 34 are inclined toward side face 22B of guide rail 22. That is, belt 34 inclines toward the opposing portion of belt 34 at the left. The opposing portion of belt 34 is also inclined toward sliders 200 and 201 by restriction plate 50 which extends in a sidewise direction from guide rail 22. That is, the cross section of toroidal shape belt 34 inclines toward each other. Since that incline defines the twist direction of belt 34, the life cycle of belt 34 becomes longer.

On the other hand, rectangular-shaped guide groove 204 penetrates in the height direction of slider 200. Guide piece 22A of guide rail 22 is inserted into guide groove 204 and slider 200 can move along guide rail 22. Also, the thickness of guide piece 22A is made thinner than the groove width in the vehicle width direction or in the vehicle sidewise direction of guide groove 204 (FIG. 22) and is movable in the vehicle width direction against guide rail 22.

Ellipse hole 206 having bottom 205 is formed at the right side of guide groove 204. Spring 207 is inserted in ellipse hole 206. One end of spring 207 is held at bottom 205, while the other end of spring 207 is held at fixed guide 209 which is fixed to carrier plate 208. Slider 200 is biased closer to slider 201 by spring 207. Therefore, ring shape belt 34 always has tension applied thereto and is prevented from loosening.

What is claimed is:

1. A window regulator for a vehicle having a door panel, the window regulator comprising:

a belt having two ends;

tension application means for applying tension to the belt, at least one end of the belt being connected to the tension application means;

an upper bracket fixed to an upper portion of the door panel, the upper bracket having an integrally formed sliding portion on which the belt slides;

a lower bracket fixed to a lower portion of the door panel; and a guide member disposed in an arch shape between the upper bracket and the lower bracket to guide the tension application means within the door panel in a substantially vertical direction.

2. A window regulator according to claim 1, including a rotary member supported on the lower bracket to engage and drive the belt, the lower bracket including a guide plate around which the belt is wound, the guide plate extending along a rotary axis of the rotary member and guiding the belt away from the rotary axis of the rotary member.

3. A window regulator for a vehicle having a door panel, the window regulator comprising:

a belt;

tension application means for applying tension to the belt, a portion of the belt being connected to the tension application means;

an upper bracket fixed to an upper portion of the door panel, the upper bracket having a sliding portion on which the belt slides;

a lower bracket fixed to a lower portion of the door panel, the lower bracket supporting a rotary member around which the belt passes, and a guide member disposed in an arch shape between the upper bracket and the lower bracket to guide the tension application means within the door panel in a substantially vertical direction, a width of a portion of the belt which slides on the sliding portion being more narrow than a remaining portion of the belt.

4. A window regulator for a vehicle having a door panel, the window regulator comprising;

a belt;

tension application means for applying tension to the belt, at least one portion of the belt being connected to the tension application means;

an upper bracket fixed to an upper portion of the door panel, the upper bracket having a sliding portion on which the belt slides;

a lower bracket fixed to a lower portion of the door panel, the lower bracket supporting a rotary member around which a portion of the belt passes, and a guide member disposed in an arch shape between the upper bracket and the lower bracket to guide the tension application means within the door panel in a substantially vertical direction, the tension application means including:

a slider connected to one end of the belt, the slider sliding along the guide member;

a fixed plate fixed to a carrier plate carrying a door glass; and biasing means installed inside an accommodating hole in the slider and the fixed plate for biasing the slider away from the fixed plate.

5. A window regulator according to claim 4, wherein the guide member includes a guide piece along which the slider and fixed plate slide, said slider and said fixed plate having guide grooves for receiving the guide piece, said guide piece having a thickness that is less than the width of the guide grooves formed on the fixed plate and the slider in a lateral direction of the vehicle.

6. A window regulator according to any one of claims 1 through 4, wherein said belt is twisted in a twist direction, the portion of the belt which is connected to the tension application means being inclined in the same direction as the twist direction of the belt, the twist direction being produced between the slider and the rotary member.

7. A window regulator for a vehicle having a door panel, the window regulator comprising:

a belt;

tension application means for applying tension to the belt, a portion of the belt being connected to the tension application means;

a guide member in an arch shape to guide the tension application means in a substantially vertical direction with respect to the door panel;

an upper bracket fixing an upper portion of the guide member to the door panel;

a lower bracket fixing a lower portion of the guide member to the door panel; and a guide body engaged with a top end of the guide member, the guide body having a belt supporting surface that slidably supports the belt and a cover which covers the belt to restrict disengagement of the belt from the guide body.

8. A window regulator according to claim 7, including a rotary member installed on the lower bracket to support a portion of the belt, and wherein the lower bracket includes:

a base plate to which the lower portion of the guide member is fixed;

a bearing extending from the base plate and supporting the rotary member to rotate thereon; and a presser piece rising from the base plate and extending along at least a portion of a circumference of the rotary member to cover the portion of the circumference of the rotary member.

9. A window regulator according to claim 8, wherein the belt is twisted in a twist direction, the portion of the belt which is connected to the tension application means being inclined in the same direction as the twist direction of the belt, the twist direction being produced between the slider and the rotary member.

10. A window regulator according to claim 7, wherein the guide body is formed with an engagement groove having a shape that is the same as a cross section of a portion of the guide rail, said portion of the guide rail being inserted into and received in the engagement groove.

11. A window regulator for a vehicle having a door panel, the regulator comprising:

a belt;

tension application means for applying tension to the belt, a portion of the belt being connected to the tension application means;

an upper bracket fixed to an upper portion of the door panel, the upper bracket having a sliding portion on which the belt slides;

a lower bracket fixed to a lower portion of the door panel, the lower bracket supporting a rotary member around which the belt is engaged; and a guide member disposed between the upper bracket and the lower bracket to guide the tension application means in a substantially vertical direction, the tension application means including:

a slider connected to the belt and sliding along the guide member; and a fixed plate fixed to a carrier plate carrying a door glass, said fixed plate sliding along said guide member.

12. A window regulator according to claim 11 wherein said lower bracket includes:

a base plate fixed to the guide member; and a stopper plate formed on the base plate at a position below a bottom end of the guide member to restrict downward movement of the carrier plate.

* * * * *